Patented Apr. 23, 1946

2,399,064

UNITED STATES PATENT OFFICE 2,399,064

WATER-SOLUBLE DISAZO DYESTUFFS AND A PROCESS FOR THEIR MANUFACTURE

Guido Schetty, Basel, Switzerland, assignor to J. R. Geigy A. G., Basel, Switzerland, a Swiss firm No Drawing. Application December 20, 1943, Serial No. 515,027. In Switzerland December 23, 1942

10 Claims. (Cl. 260—190)

It has been found that water-soluble disazo dyestuffs dyeing animal fibres in blue shades are obtained by combining a diazotised amino-aryl sulfonic acid-aryl ester sulfonic acid with α-naphthylamine, further diazotising the obtained amino azo dyestuff and coupling the diazo compound with a 1-arylamino-naphthalene-8-sulfonic acid. As initial components there come into question for example 1-aminobenzene-3-sulfonic acid phenyl ester-$x'$-sulfonic acid, 4- or 6-methyl-1-aminobenzene - 3 - sulfonic acid - 2'- methylphenyl ester-$x'$-sulfonic acid, 6- or 4-chloro-1-aminobenzene-3-sulfonic acid - 2'- methyl -(or -2'-methoxy-) phenyl ester-$x'$-sulfonic acid, 6- or 4-methoxy - 1 - aminobenzene-3-sulfonic acid - 2'- methyyphenyl-ester - $x'$- sulfonic acid. These compounds are produced by first condensing the corresponding nitroaryl sulfonic acid halides, e. g. nitrobenzene sulfochloride, with hydroxyaryl compounds, such as for instance 2-methylphenol, 2-methoxyphenol, then sulfonating the obtained nitroaryl sulfonic acid aryl ester with sulfuric acid monohydrate at a moderately raised temperature or with fuming sulfuric acid at room temperature and finally reducing the nitro groups according to known methods, for example by catalytically activated hydrogen.

When compared with the dyestuffs from aminodiaryl-sulfone-sulfonic acids→α-naphthylamine→1-aryl-aminonaphthalene-8-sulfonic acid, the new dyestuffs obtainable according to the present invention show a better levelling power, somewhat better light-fastness, moreover, mostly purer shades and often a better evening color besides equally good fastness properties in the moist state.

The following examples, without being limitative, illustrate the present invention. The parts are by weight.

Example 1

35.7 parts of 6-methyl-1-aminobenzene-3-sulfonic acid-2'-methylphenylester-$x'$-sulfonic acid are neutral dissolved in 100 parts of warm water by means of 5.4 parts of anhydrous sodium carbonate, then treated with a solution of 6.9 parts of sodium nitrite and allowed to run under cooling into a solution of 29 parts of concentrated hydrochloric acid in 50 parts of water. The diazo compound, which partly has precipitated in a powdery form, is coupled in the usual manner with 14.3 parts of α-naphthylamine, then the so-obtained amino azo dyestuff is suspended in 400 parts of water and clearly dissolved by means of sodium carbonate. After addition of a solution of 7.6 parts of sodium nitrite this solution is cooled down to 0°–5° C., the same is treated with 50 parts of concentrated hydrochloric acid. After completion of the diazotation the brown, difficultly soluble diazo compound is isolated and, while stirring, added to a solution consisting of 32.1 parts of the sodium salt of 1-phenylamino-naphthalene-8-sulfonic acid, 17 parts of crystallised sodium acetate and 5 parts of acetic acid in 400 parts of water. After some hours the dyestuff formation is complete. On heating to 70° C. and neutralising by means of sodium carbonate the dyestuff precipitates out in form of a dark bronzy powder which is hot filtered off, washed with a warm diluted solution of common salt and finally dried. The dyestuff dyes wool from a neutral or slightly acid bath in even full, blue shades of excellent fastness properties to fulling and to sea-water and of very good light-fastness.

If in the above example the starting component is replaced by 1-aminobenzene-3-sulfonic acid-2'-methylphenylester-$x'$-sulfonic acid, a dyestuff is obtained which constitutes a dark bronzy powder dissolving in water with a blue coloration and dyeing wool in blue shades of excellent fastness properties. Instead of 1-phenylamino-naphthalene-8-sulfonic acid, 1-p-tolylamino-naphthalene-8-sulfonic acid may be used.

Similar dyestuffs are obtained by using 1-amino-benzene-3-sulfonic acid phenylester-$x'$-sulfonic acid, 1-aminobenzene-3-sulfonic acid-2'-methoxy- or -2'-ethoxy- or -2'-propoxyphenyl-ester-$x'$-sulfonic acid, 4-methyl-1-aminobenzene-3-sulfonic acid-2'-methylphenylester-$x'$-sulfonic acid or 1-aminobenzene-3-sulfonic acid-1'- or -2'-naphthylester-$x'$-sulfonic acid and the like instead of 6-methyl-1-aminobenzene-3-sulfonic acid-2'-methylphenylester-$x'$-sulfonic acid.

Example 2

37.8 parts of 4 - chloro - 1 - aminobenzene - 3-sulfonic acid - 2'-methylphenylester-$x'$-sulfonic acid are diazotised in the manner indicated in Example 1, then coupled with α-naphthylamine and, after having dissolved the wine-red amino azo dyestuff in 300 parts of water with sodium carbonate, the same is again precipitated by adding 80 parts of common salt thereto. To a thin-liquid suspension of the said amino azo dyestuff treated with 7.6 parts of sodium nitrite are added 50 parts of concentrated hydrochloric acid. Then the brown diazo compound thus completely precipitated is filtered by suction after some hours, again suspended with 200 parts of cold water, coupled with 32.1 parts of the sodium salt of 1-phenylaminonaphthalene-8-sulfonic acid in the manner described in Example 1 and the finished diazo dyestuff is isolated. After drying it constitutes a dark bronzy powder dyeing wool from a neutral or slightly acid bath in very even, bloomy, blue shades of excellent fastness properties to fulling and to sea-water and of a very good light-fastness.

If in this Example the 4-chloro-1-aminobenzene-3-sulfonic acid-2'-methylphenylester-x'-sulfonic acid is replaced by 6-chloro-1-aminobenzene - 3-sulfonic acid-2'-methylphenylester-x'-sulfonic acid, a dyestuff is obtained which is a dark, bronzy powder dissolving in water with a blue coloration and dyeing wool in blue shades of very good fastness properties.

What I claim is:

1. Process for the manufacture of soluble disazo dyestuffs, which comprises coupling a diazotised compound of the general formula

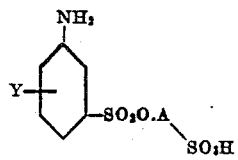

wherein A means a member of the group consisting of the phenyl, the methylphenyl, the alkoxyphenyl and the naphthyl radical, the alkoxy group containing a low alkyl radical, and Y stands for a member of the group consisting of H, Cl and CH₃, with α-naphthylamine, diazotising the amino azo dyestuff and coupling the diazo compound with 1-arylaminonaphthalene-8-sulfonic acid, aryl meaning a hydrocarbon nucleus of the benzene series.

2. Process for the manufacture of soluble disazo dyestuffs, wihch comprises coupling a diazotised compound of the general formula

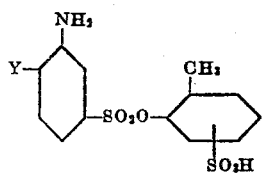

wherein Y stands for a member of the group consisting of H, Cl and CH₃, with α-naphthylamine, diazotising the amino azo dyestuff and coupling the diazo compound with 1-phenylaminonaphthalene-8-sulfonic acid.

3. Process for the manufacture of a soluble disazo dyestuff, which comprises coupling the diazotised compound of the formula

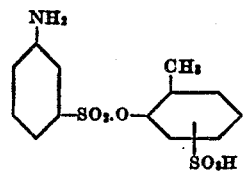

with α-naphthylamine, diazotising the amino azo dyestuff and coupling the diazo compound with 1-phenylaminonaphthalene-8-sulfonic acid.

4. Process for the manufacture of a soluble disazo dyestuff, which comprises coupling the diazotised compound of the formula

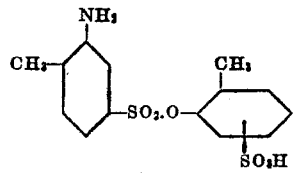

with α-naphthylamine, diazotising the amino azo dyestuff and coupling the diazo compound with 1-phenylaminonaphthalene-8-sulfonic acid.

5. Process for the manufacture of a soluble disazo dyestuff, which comprises coupling the diazotised compound of the formula

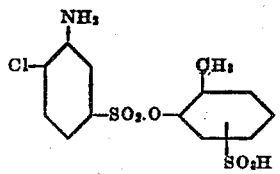

with α-naphthylamine, diazotising the amino azo dyestuff and coupling the diazo compound with 1-phenylaminonaphthalene-8-sulfonic acid.

6. The dyestuffs of the general formula

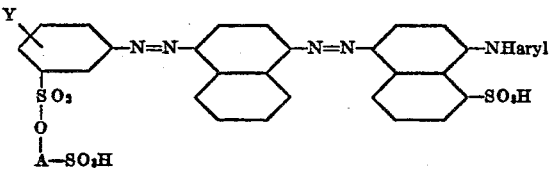

wherein A means a member of the group consisting of the phenyl, the methylphenyl, the alkoxyphenyl and the naphthyl radical, the alkoxy group containing a low alkyl radical, Y stands for a member of the group consisting of H, Cl and CH₃ and aryl meaning a hydrocarbon nucleus of the benzene series, being dark powders, dissolving in water with a blue coloration and dyeing wool in blue shades of excellent light-fastness.

7. The dyestuffs of the general formula

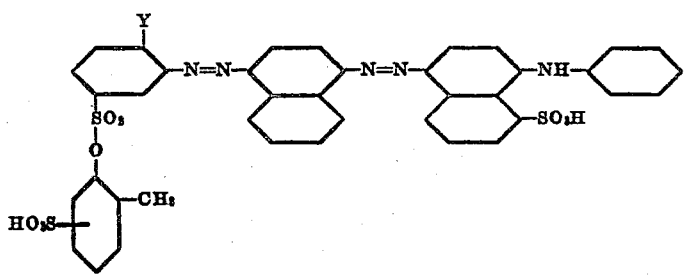

wherein Y stands for a member of the group consisting of H, Cl and CH₃, being dark powders, dissolving in water with a blue coloration and dyeing wool in blue shades of excellent light-fastness.

8. The dyestuff of the formula

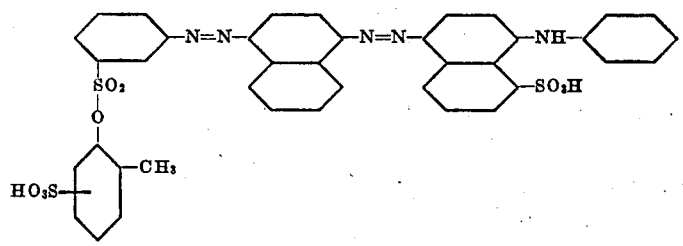

being a dark powder, dissolving in water with a blue coloration and dyeing wool in blue shades of excellent light-fastness.

9. The dyestuff of the formula

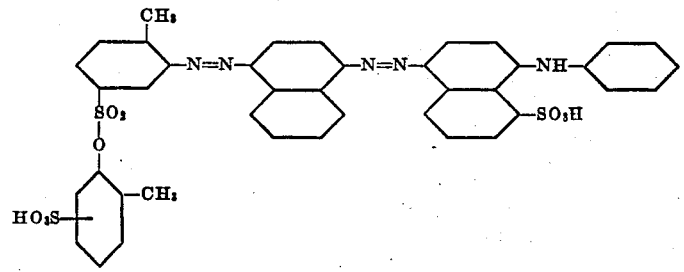

being a dark powder, dissolving in water with a blue coloration and dyeing wool in blue shades of excellent light-fastness.

10. The dyestuff of the formula

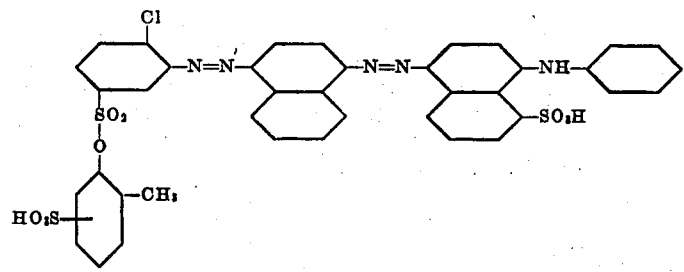

being a dark powder, dissolving in water with a blue coloration and dyeing wool in blue shades of excellent light-fastness.

GUIDO SCHETTY.